United States Patent
Padgett et al.

(10) Patent No.: US 9,342,216 B2
(45) Date of Patent: May 17, 2016

(54) DYNAMIC INTERACTIVE MENU BOARD

(71) Applicant: Disney Enterprises, Inc., Burbank, CA (US)

(72) Inventors: John M. Padgett, Clermont, FL (US); Michael Sheehan, Windermere, FL (US); Bonnie J. Spivey, Celebration, FL (US); Randy Chancey, Windermere, FL (US); Bart D. Butler, Celebration, FL (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 297 days.

(21) Appl. No.: 13/861,165

(22) Filed: Apr. 11, 2013

(65) Prior Publication Data

US 2014/0310651 A1 Oct. 16, 2014

(51) Int. Cl.
*G06F 3/00* (2006.01)
*G06F 3/048* (2013.01)
*G06F 3/0482* (2013.01)
*G06F 17/30* (2006.01)
*G06F 3/14* (2006.01)

(52) U.S. Cl.
CPC ........ *G06F 3/0482* (2013.01); *G06F 17/30867* (2013.01)

(58) Field of Classification Search
None
See application file for complete search history.

(56) References Cited

U.S. PATENT DOCUMENTS

| | | | |
|---|---|---|---|
| 4,222,111 A | 9/1980 | Sloan | |
| 5,262,938 A | 11/1993 | Rapoport et al. | 364/401 |
| 6,088,681 A | 7/2000 | Coleman | |
| 6,973,437 B1 | 12/2005 | Olewicz | |
| 7,385,479 B1 | 6/2008 | Green | |
| 7,680,690 B1 | 3/2010 | Catalano | 705/15 |
| 7,716,083 B1* | 5/2010 | Stouvenot | 705/26.5 |
| 7,870,166 B2* | 1/2011 | Lutnick | G06Q 10/10 705/15 |
| 7,953,873 B1* | 5/2011 | Madurzak | G06Q 50/12 705/15 |
| 8,660,906 B2* | 2/2014 | Woycik | G06Q 20/367 705/26.1 |
| 8,799,083 B1 | 8/2014 | Silver | |
| 2001/0025279 A1* | 9/2001 | Krulak | G06Q 30/06 |
| 2001/0026291 A1* | 10/2001 | Uchida | G01C 21/3611 715/810 |
| 2002/0026364 A1 | 2/2002 | Mayer | |
| 2002/0052790 A1 | 5/2002 | Tomishima | |
| 2003/0090387 A1 | 5/2003 | Lestienne et al. | 340/825.49 |
| 2003/0158465 A1* | 8/2003 | Galli | G06F 19/3481 600/300 |
| 2003/0208409 A1* | 11/2003 | Mault | G06F 19/3475 705/15 |
| 2003/0225731 A1* | 12/2003 | Vidgen | 707/1 |
| 2004/0054592 A1 | 3/2004 | Hernblad | 705/15 |
| 2004/0069313 A1* | 4/2004 | DeLaquil | G06Q 50/12 705/15 |
| 2004/0080399 A1 | 4/2004 | Foster | |
| 2004/0138929 A1 | 7/2004 | Awiszus | |

(Continued)

*Primary Examiner* — Yongjia Pan
(74) *Attorney, Agent, or Firm* — Sheppard Mullin Richter & Hampton LLP

(57) ABSTRACT

This disclosure relates to a system configured to customize a default set of menu items for diners of a food service establishment. The default set of menu items may be customized based on dietary preferences of the diners. The system may be configured such that diners may interact with the menu of the food service establishment. The system may be configured such that the customized set of menu items may be displayed to diners remotely from the food service establishment. In some implementations, the system may replace a traditional physical menu. In some implementations, the system may comprise an application server, one or more client devices, a database server, and/or other components.

20 Claims, 4 Drawing Sheets

(56) References Cited

U.S. PATENT DOCUMENTS

| | | | |
|---|---|---|---|
| 2004/0143503 A1 | 7/2004 | Suthar | |
| 2004/0158499 A1* | 8/2004 | Dev | G06Q 30/0601 705/26.1 |
| 2005/0030162 A1 | 2/2005 | Stambaugh | |
| 2005/0075934 A1* | 4/2005 | Knight | G06Q 50/12 705/15 |
| 2005/0171800 A1* | 8/2005 | Yamaguchi | G06Q 50/12 715/811 |
| 2007/0038727 A1* | 2/2007 | Bailey | G06Q 10/02 709/219 |
| 2007/0178912 A1 | 8/2007 | Baranowski | |
| 2008/0120188 A1 | 5/2008 | Mobley et al. | 705/15 |
| 2009/0024456 A1 | 1/2009 | Risnoveanu et al. | 705/11 |
| 2009/0076920 A1* | 3/2009 | Feldman et al. | 705/15 |
| 2009/0112377 A1 | 4/2009 | Schalla et al. | 701/3 |
| 2009/0204470 A1 | 8/2009 | Weyl | |
| 2010/0106607 A1* | 4/2010 | Riddiford et al. | 705/15 |
| 2010/0161432 A1* | 6/2010 | Kumanov | G06Q 20/102 705/15 |
| 2010/0179864 A1* | 7/2010 | Feldman et al. | 705/12 |
| 2011/0123964 A1* | 5/2011 | Aronis et al. | 434/127 |
| 2011/0258058 A1* | 10/2011 | Carroll | G06Q 50/12 705/15 |
| 2011/0318717 A1* | 12/2011 | Adamowicz | 434/127 |
| 2012/0136731 A1* | 5/2012 | Kidron et al. | 705/15 |
| 2012/0233002 A1* | 9/2012 | Abujbara | 705/15 |
| 2012/0323707 A1* | 12/2012 | Urban | 705/15 |
| 2013/0085345 A1* | 4/2013 | Geisner et al. | 600/300 |
| 2013/0090959 A1 | 4/2013 | Kvamme | |
| 2013/0132246 A1 | 5/2013 | Amin et al. | 705/34 |
| 2013/0138515 A1 | 5/2013 | Taniguchi | |
| 2013/0211814 A1* | 8/2013 | Derks et al. | 704/2 |
| 2013/0261183 A1* | 10/2013 | Bhagat | 514/560 |
| 2013/0311311 A1* | 11/2013 | Chopra | G06Q 50/12 705/15 |
| 2014/0122148 A1 | 5/2014 | Padgett et al. | 705/7.15 |
| 2014/0122170 A1 | 5/2014 | Padgett et al. | 705/7.29 |
| 2014/0122263 A1 | 5/2014 | Padgett et al. | 705/15 |
| 2014/0282265 A1* | 9/2014 | Shaich | G06F 3/0482 715/841 |
| 2014/0310651 A1 | 10/2014 | Padgett | |
| 2015/0081478 A1* | 3/2015 | Bahrami | G06F 3/0485 705/27.1 |

* cited by examiner

DYNAMIC INTERACTIVE MENU BOARD

FIELD OF THE DISCLOSURE

This disclosure relates to a system configured to customize a default set of menu items for diners of a food service establishment. The default set of menu items may be customized based on dietary preferences of the diners.

BACKGROUND

Traditional menu boards are static, printed materials that are located in and/or near an associated restaurant. Traditional menu boards allow a diner to view menu items once they have arrived at the restaurant. Digital signage allows the possibility of making menu boards dynamically changeable, but typical digital menu boards are currently deployed in proximity to the associated restaurant according to the same model used for printed menu boards. Typically a menu board is dedicated to a particular restaurant and will display the theme and menu items of that particular restaurant to which it is dedicated. The dedicated relationship and proximate location makes it easy for the diner to identify the menu board for a desired restaurant, but leads to a great deal of duplicated hardware for restaurants wishing to deploy menu boards in multiple locations.

Alternatively, menus are currently displayed via the internet on mobile devices. This allows a single device to support any number of restaurant menus irrespective of their proximity at the inconvenience of causing the diner to enter an internet address or search for the desired restaurant amongst unconstrained choices. Location aware internet services do simplify this somewhat by constraining choices to proximate dining establishments, however, existing solutions do not present dedicated interactive menu boards.

SUMMARY

One aspect of the disclosure relates to a system configured to customize a default set of menu items for diners of a food service establishment. The default set of menu items may be customized based on dietary preferences of the diners. In some implementations, the system may comprise one or more processors configured to execute computer program modules. The computer program modules may comprise a menu module, a customization module, a user module, a communication module, and/or other modules.

The menu module may be configured to define a user interface. The user interface may present the default set of menu items to the diners. The user interface may facilitate entry and/or selection of dietary preference information from the diners. The menu module may be configured such that the dietary preference information includes one or more of the dietary preferences of the diners, religious preferences of the diners, specific dietary labels, and/or other information. The specific dietary labels may include one or more of vegetarian, vegan, gluten free, kosher, and/or other labels.

The customization module may be configured to determine customized sets of menu items for presentation through the user interface. The customization module may be configured to determine the customized sets based on received dietary preference information. Responsive to receiving first dietary preference information from a first diner, the customization module may determine a first customized set of menu items. The menu module may be configured such that the user interface presents the customized sets of menu items to the corresponding diners.

In some implementations, the customization module may be configured to determine the first customized set of menu items such that a first menu item not in the default set of menu items is included in the first customized set of menu items.

In some implementations, the menu module may be configured such that the default menu items include default ingredient information associated with the default menu items. The customization module may be configured to determine customized ingredient information associated with the customized sets of menu items based on the dietary preference information.

The user module may be configured to manage user profiles of the diners. The customization module may be configured to determine the customized sets of menu items based on the user profiles of the diners. The user module may be configured such that the user profiles include dietary preference information for the diners. The user module may be configured such that the dietary preference information in the user profiles is determined based on one or more of past dietary preference information entered and/or selected by the diners and/or past menu selections made by the diners.

The communication module may be configured to transmit the definition of the user interface to a client device associated with an individual diner. In some implementations, the client device associated with the individual diner may be located remotely from the food service establishment. In some implementations, the communication module may be configured to transmit the definition of the user interface to a client device associated with the food service establishment.

Another aspect of the present disclosure relates to a method for customizing a default set of menu items for diners of a food service establishment. The customization may be based on dietary preferences of the diners. The method may comprise defining a user interface such that the user interface presents the default set of menu items to the diners and facilitates entry and/or selection of dietary preference information from the diners; determining customized sets of menu items for presentation through the user interface based on received dietary preference information such that, responsive to receiving first dietary preference information from a first diner, a first customized set of menu items is determined; and presenting the customized sets of menu items to the corresponding diners. The dietary preference information may include one or more of the dietary preferences of the diners, religious preferences of the diners, or specific dietary labels. The specific dietary labels may include one or more of vegetarian, vegan, gluten free, kosher, and/or other labels.

The first customized set of menu items may be determined such that a first menu item not in the default set of menu items is included in the first customized set of menu items. The default menu items may include default ingredient information associated with the default menu items. The method may further comprise determining customized ingredient information associated with the customized sets of menu items based on the dietary preference information.

The method may further comprise managing user profiles of the diners, and determining the customized sets of menu items based on the user profiles of the diners. The user profiles may include dietary preference information for the diners. The dietary preference information in the user profiles may be determined based on one or more of past dietary preference information entered and/or selected by the diners or past menu selections made by the diners.

The method may further comprise transmitting the definition of the user interface to a client device associated with an individual diner. The client device associated with the individual diner may be located remotely from the food service establishment. The method may further comprise transmitting the definition of the user interface to a client device associated with the food service establishment.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
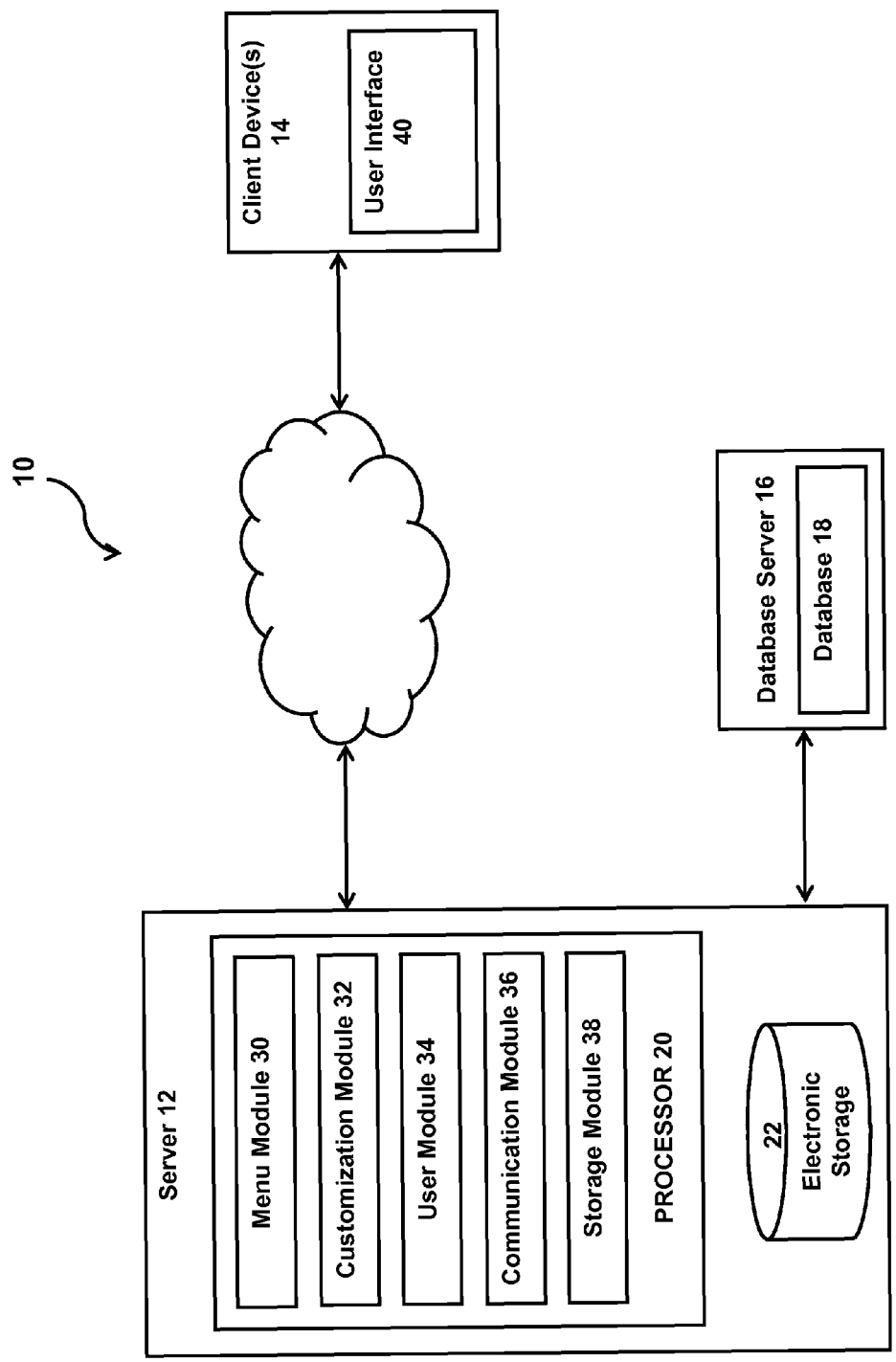
FIG. 1 illustrates a system configured to customize a default set of menu items for diners of a food service establishment.

FIG. 1 illustrates a system 10 configured to customize a default set of menu items for diners of a food service establishment. The default set of menu items may be customized based on dietary preferences of the diners. System 10 may be configured such that diners may interact with the menu of the food service establishment. System 10 may be configured such that the customized set of menu items may be displayed to diners remotely from the food service establishment. It should be noted that the description of system 10 with respect to one food service establishment provided herein is not intended to be limiting. System 10 may be configured to support multiple food service establishments. The default set of menu items and/or the customized menu items may change based on the food service establishment. It is also thought that system 10 may be customized to include mechanisms to identify diners viewing the menu items, identify reservations and/or dining plans previously made by the diner, and/or automatically display an appropriate menu board for a diner's target food service establishment. In some implementations, system 10 may replace a traditional physical menu. In some implementations, system 10 may comprise an application server 12, one or more client devices 14, a database server 16, and/or other components.

Database server 16 may host a relational or non-relational database 18. Database 18 may be configured to electronically store user information related to the diners of the food service establishment, information related to the dietary preferences, of the diners, information related to previous menu selections made by the diners, recipe information associated with the menu items, ingredient information associated with the menu items, and/or other information. In some implementations, database 18 may be prepopulated (e.g., before a diner begins interacting with the menu) with the information. Application server 12 may communicate directly with database server 16 and/or application server 12 may communicate with database server 16 via a network. In some implementations, application server 12 may include database server 16.

Server 12 may comprise a processor 20, electronic storage 22, and/or other components. As shown in FIG. 1, processor 20 may be configured to execute one or more computer program modules. The computer program modules may comprise one or more of a menu module 30, a customization module 32, a user module 34, a communication module 36, a storage module 38, and/or other modules.

Menu module 30 may be configured to define a user interface 40 such that user interface 40 presents the default set of menu items to the diners. Menu module 30 may be configured to define user interface 40 such that user interface 40 facilitates entry and/or selection of dietary preference information from the diners. Menu module 30 may be configured to define user interface 40 such that user interface 40 facilitates entry and/or selection of dining information related to other aspects of a diner's dining experience. Dining information related to other aspects of a diner's dining experience may include diner profile information (e.g., a user login), party size information, reservation information, final menu selections, purchase information, date and time information, and/or other information. In some implementations, such as when system 10 is configured to support multiple food service establishments, menu module 30 may be configured such that user interface 40 facilitates entry and/or selection of the diner's choice of food service establishment. Responsive to receiving information designating the diner's choice of food service establishment, menu module 30 may be configured to define user interface 40 such that user interface 40 presents a default set of menu items that corresponds to the diner's choice of food service establishment.

Figure 2A:
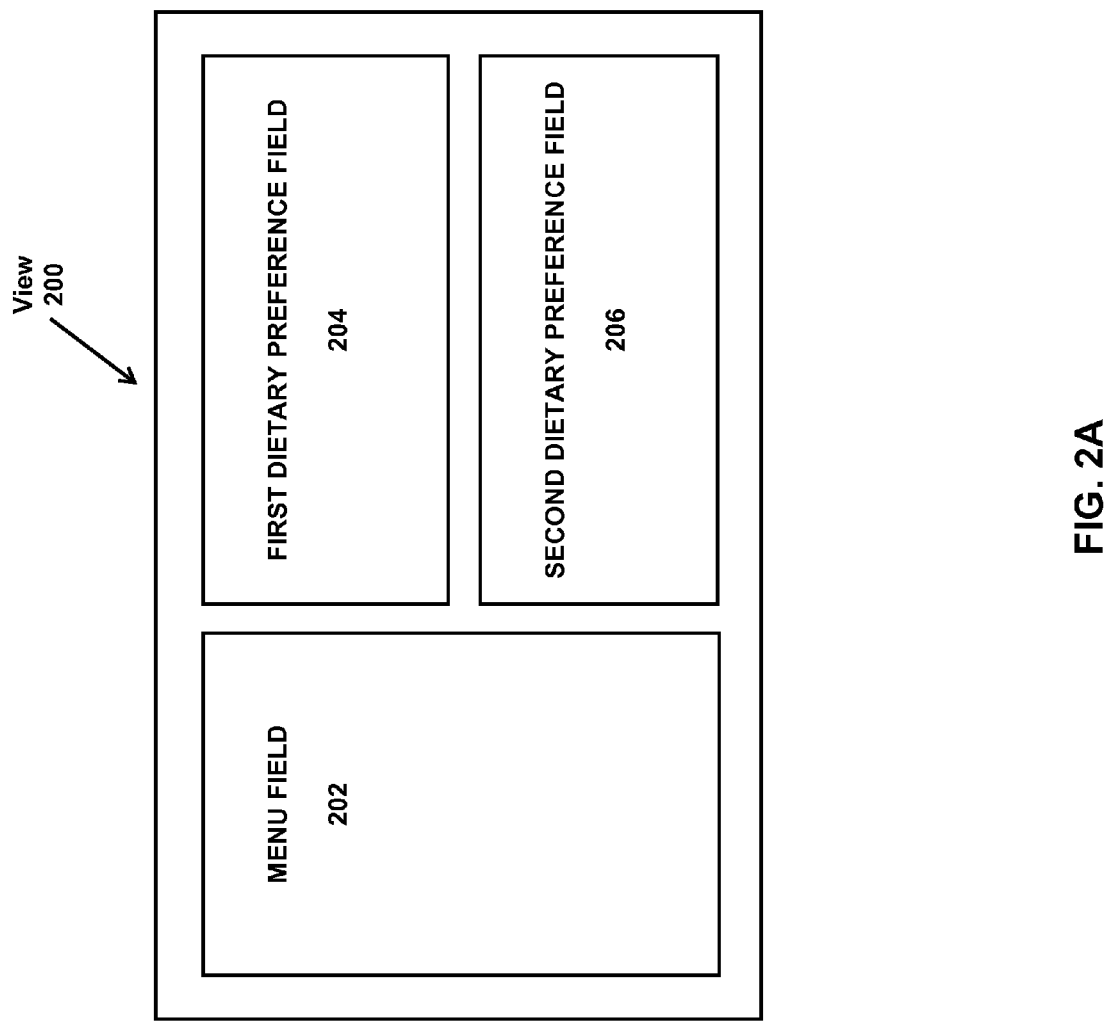
FIG. 2A illustrates a first view of a user interface.
Figure 2B:
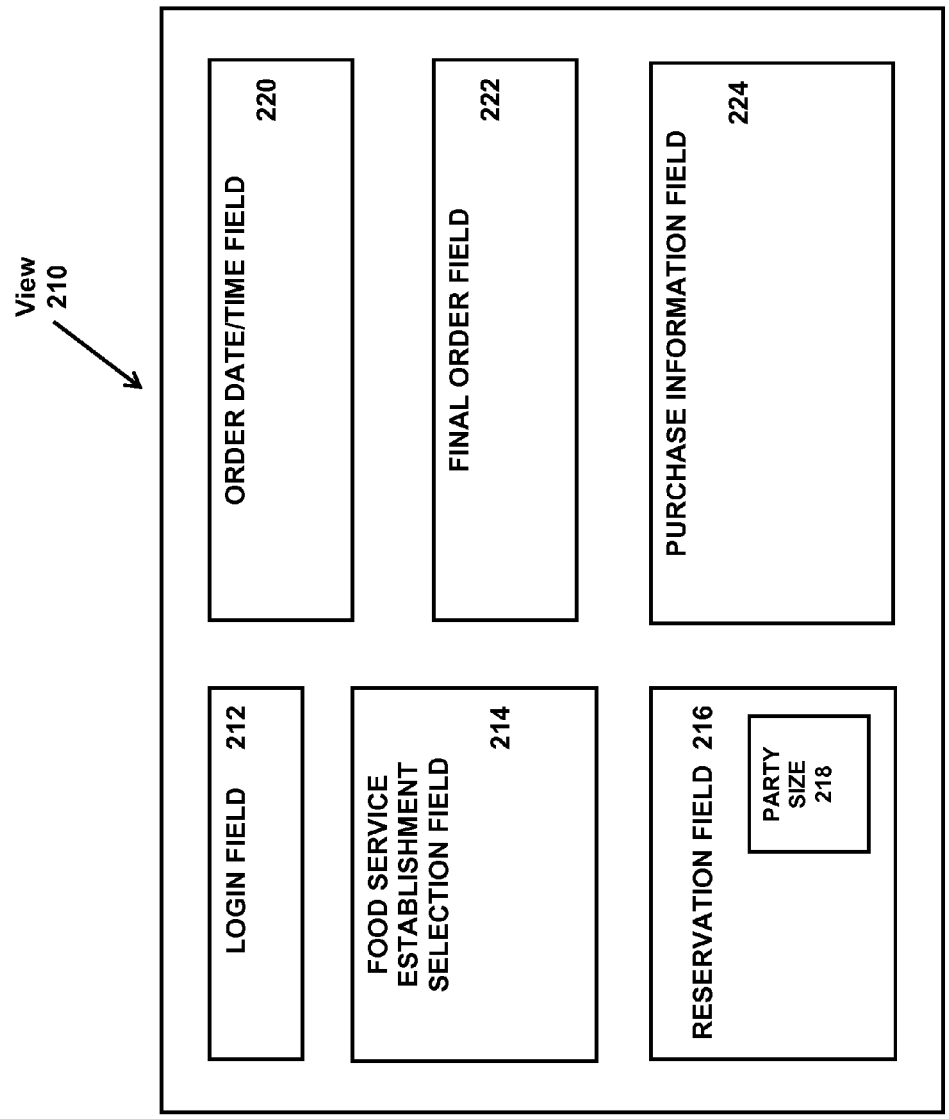
FIG. 2B illustrates a second view of the user interface.

For example, FIG. 2A and FIG. 2B illustrate a first view 200, and a second view 210 of a user interface. View 200 (FIG. 2A) includes a menu field 202, a first dietary preference field 204, and a second dietary preference field 206. In some implementations, menu field 202 may be configured to display menu items. Field 204 may be configured to receive entry and/or selection of specific items or classes of items (e.g., meat) to be included in and/or excluded from the menu. This may include presenting a list of selectable items (e.g., ingredients), and receiving selection and/or de-selection from diners, for example. Field 206 may be configured to receive entry and/or selection of additional information related to menu items from the diners. For example, the additional information may include preparation instructions such as asking for a specific ingredient on the side (e.g., salad dressing on the side), or asking for a menu item to be prepared in a part of the kitchen (e.g., on a special surface) away from allergens (e.g., nuts). In some implementations, a diner may type the other information into field 206. In some implementations, the other information may be selectable by the diner. In some implementations, the menu items may be regenerated automatically (e.g., by customization module 32 shown in FIG. 1, and described below) as each entry and/or selection is made via fields 204 and/or 206.

View 210 (FIG. 2B) includes a login field 212, a food service establishment selection field 214, a reservation field 216, a party size field 218, an order date/time field 220, a final order field 222, and a purchase information field 224. Login field 212 may be configured to receive entry and/or selection of identification login information from a diner. The login information may facilitate identification of dining plans and/or dietary preference entries and/or selections previously made by the diner such that an appropriate set of default menu items may be displayed to the diner, for example. In some implementations, diners may choose not to enter login information into login field 212.

Food service establishment selection field 214 may be configured to receive entry and/or selection of a food service establishment by the diners. Menu module 30 (shown in FIG. 1) may be configured to define user interface 40 such that user interface 40 presents menu items (e.g., default and/or customized) to the diners that correspond to the selected food service establishment.

Reservation field 216 may be configured to receive entry and/or selection of reservation request information from diners. Reservation request information may include a party size, a date, a time, a food service establishment, and/or other information. Party size field 218 may be configured to receive entry and/or selection of a party size, for example. In some implementations (e.g., when a diner is "logged in"), reservation field 216 may be configured to display confirmed reservations previously requested by the diners.

Order date/time field 220 may be configured to receive entry and/or selection of date and/or time information related to a diner placing an order for a specific date and/or time. Final order field 222 may be configured to receive entry and/or selection of a confirmation of the diner's final order from the diner. In some implementations, final order field 222 may be configured to display the diner's order prior to and/or after confirmation from the diner. Purchase information field 224 may be configured to receive entry and/or selection of purchase information from the diner. The purchase information may include credit card information, online payment information (e.g., Paypal), and/or other purchase information.

Returning to FIG. 1, menu module 30 may be configured such that the dietary preference information includes one or more of the dietary preferences of the diners, religious preferences of the diners, specific dietary labels, a maximum calorie content, allergens, and/or other information. The allergens may include, for example, foods such as dairy, shellfish, tree nuts, peanuts, and/or other food and/or drink allergens. In some implementations, the specific dietary labels may include vegetarian, vegan, gluten free, kosher, and/or other dietary labels. In some implementations, menu module 30 may be configured such that the default menu items include default ingredient information, calorie information, and/or other information associated with the default menu items.

Customization module 32 may be configured to determine customized sets of menu items for presentation through user interface 40. Customization module 32 may be configured to determine the customized sets of menu items based on the received dietary preference information. Customization module 32 may be configured to regenerate the set of menu items based on the dietary preferences of the diner. For example, responsive to receiving first dietary preference information from a first diner, customization module 32 may determine a first customized set of menu items. The menu module may be configured such that user interface 40 presents the customized sets of menu items to the corresponding diners (e.g., the first customized set of menu items is presented to the first diner).

In some implementations, customization module 32 may be configured to determine the first customized set of menu items such that a first menu item not in the default set of menu items is included in the first customized set of menu items. Customization module 32 may be configured to build a recipe for the first menu item from the recipe and/or ingredient information in database 18, for example.

In some implementations, customization module 32 may be configured to determine customized ingredient information associated with the default set and/or the customized sets of menu items based on the dietary preference information. For example, customization module 32 may be configured to customize the ingredients of the default set of menu items such that the menu items are gluten free, and/or determine a new set of gluten free menu items. In some implementations, customization module 32 may be configured to determine customized ingredient information (e.g., no mayonnaise) associated with an individual dish based on the dietary preference information.

The customized ingredient information may be used by a chef, for example, to prepare the individual dish according to the dietary preferences of the diner. In some implementations, system 10 may eliminate the need for a chef to personally visit a diner to determine a custom menu item according to the dietary preferences of the diner.

User module 34 may be configured to manage user profiles of the diners. User module 34 may be configured such that the user profiles include dietary preference information for the diners, information related to previous menu selections made by the diners, information related to reservations made by the diner, and/or other information. The information in the user profiles may be determined based on entries and/or selections made by the diners via user interface 40 (e.g., the diners may enter information about themselves and/or enter menu selections), may include previous menu selections made by the diners and saved by system 10, may be deduced from previous menu selections made by the diners, may be programmed at manufacture (e.g., such that dietary preference information may be retrieved from a pre-existing user profile), and/or may be determined via other methods. For example, user module 34 may be configured such that the dietary preference information in the user profiles is determined based on one or more of past dietary preference information entered and/or selected by the diners, or past menu selections made by the diners. In some implementations, customization module 32 may be configured to determine the customized sets of menu items based on the user profiles of the diners. In some implementations, the diners may be anonymous, not having an associated user profile managed by user module 34.

Communication module 36 may be configured to transmit the definition of the user interface to client device 14. In some implementations, client device 14 may be associated with an individual diner. Client device 14 may be located remotely from the food service establishment. In some implementations, communication module 36 may be configured to transmit the definition of the user interface to a client device associated with the food service establishment.

In some implementations, communication module 36 may be configured to obtain the dietary preference information related to an order placed by a diner via user interface 40 and transmit the dietary preference information to a kitchen display system (KDS) in the kitchen of the food service establishment (not shown). The dietary preference information may include special preparation instructions, for example, so that employees of the food service establishment may prepare the dish in a special area and/or with special procedures.

In some implementations, communication module 36 may be configured to obtain the dining information related to other aspects of a diner's dining experience (e.g., food service establishment selection, party size information, reservation information, final menu selections, purchase information, date and time information, and/or other information) and transmit the dining information to the appropriate food service establishment, for example.

Storage module 38 may be configured to store user information related to the diners of the food service establishment, information related to the dietary preferences, of the diners, information related to previous menu selections made by the diners, recipe information associated with the menu items, ingredient information associated with the menu items, calorie information, and/or other information electronically. Storage module 38 may be configured to store the information in electronic storage 22, in database 18 of database server 16, and/or in other locations. In some implementations, storage module 38 may be configured to store the information such that it can be retrieved at a later time responsive to a user request via user interface 40.

A given client device 14 may include one or more processors, an electronic display, a control interface, and/or other components. The one or more processors may be configured to execute computer program modules. The computer program modules may be configured to enable a user (e.g., a diner of the food service establishment) associated with the given client device 14 to interface with system 10, and/or provide other functionality to client devices 14. By way of non-limiting example, client devices 14 may include one or more of a desktop computer, a laptop computer, a handheld computer, a tablet computing platform, a NetBook, a Smartphone, a gaming console, and/or other computing platforms and/or devices.

Application server 12 may be configured to communicate with client devices 14, and/or other client computing platforms according to a client/server relationship. In some implementations, communication may be wireless. In some implementations, application server 12, client devices 14, database server 16, and/or external resources may be operatively linked via one or more electronic communication links. For example, such electronic communication links may be established, at least in part, via a network such as the Internet and/or other networks. In some implementations, application server 12 may communicate directly with client devices 14, database server 16, and/or other devices. It will be appreciated that this is not intended to be limiting, and that the scope of this disclosure includes implementations in which application server 12, client devices 14, and/or other devices may be operatively linked via some other communication media. Although application server 12 is shown in FIG. 1 as a single entity, this is for illustrative purposes only. In some implementations, application server 12 may include a plurality of servers. Application server 12 may represent processing functionality of a plurality of servers operating in coordination (e.g., in a cloud configuration).

The end user may interact with system 10, application server 12, database server 16, and/or other devices, through user interface 40. In some implementations, user interface 40 may include a graphical user interface presented via client devices 14, and/or other devices. User interface 40 may be configured to provide an interface between system 10 and one or more users (e.g., diners of the food service establishment) through which the user provides information to and receives information from system 10. This enables dietary preference information, data, results, and/or instructions and any other communicable items, collectively referred to as "information," to be communicated between the user (e.g, a diner of the of food service establishment) and one or more of application server 12, processor 20, database server 16, electronic storage 22, and/or other components of system 10.

In some implementations, user interface 40 may be a physical user interface and may include interface devices. Examples of interface devices suitable for inclusion in user interface 40 include a keypad, buttons, switches, a keyboard, knobs, levers, a display screen, a touch screen, speakers, a microphone, a printer, and/or other interface devices. It is to be understood that other communication techniques, either hard-wired or wireless, are also contemplated by the present disclosure as user interface 40. Other exemplary input devices and techniques adapted for use with client device 14 as user interface 40 include, but are not limited to, an RS-232 port, RF link, an IR link, modem (telephone, cable or other). In short, any technique for communicating information with system 10 is contemplated by the present disclosure as user interface 40.

In some implementations, electronic storage 22 may be configured to store software algorithms, information determined by processor 20, information received via user interface 40, and/or other information that enables system 10 to function properly. The information stored in electronic storage 22 may be accessible by processor 20, database server 16, client devices 14, and/or other components of system 10. The electronic storage media of electronic storage 22 may comprise one or both of system storage that is provided integrally (i.e., substantially non-removable) with one or more components of application server 12 and/or removable storage that is connectable to one or more components of application server 12 via, for example, a port (e.g., a USB port, a firewire port, etc.) or a drive (e.g., a disk drive, etc.). In some implementations, electronic storage 22 may be configured as cloud storage accessed through, for example, the network.

Processor 20 may be configured to provide information processing capabilities in application server 12. As such, processor 20 may include one or more of a digital processor, an analog processor, a digital circuit designed to process information, an analog circuit designed to process information, a state machine, and/or other mechanisms for electronically processing information. Although processor 20 is shown in FIG. 1 as a single entity, this is for illustrative purposes only. In some implementations, processor 20 includes a plurality of processing units. These processing units may be physically located within the same device, or processor 20 may represent processing functionality of a plurality of devices operating in coordination.

Processor 20 may be configured to execute modules 30, 32, 34, 36, and/or 38 by software; hardware; firmware; some combination of software, hardware, and/or firmware; and/or other mechanisms for configuring processing capabilities on processor 20.

It should be appreciated that although modules 30, 32, 34, 36, and 38 are illustrated in FIG. 1 as being co-located within a single processing unit, in implementations in which processor 20 includes multiple processing units, one or more of modules 30, 32, 34, 36, and/or 38 may be located remotely from the other modules. The description of the functionality provided by the different modules 30, 32, 34, 36, and/or 38 described below is for illustrative purposes, and is not intended to be limiting, as any of modules 30, 32, 34, 36, and/or 38 may provide more or less functionality than is described. For example, one or more of modules 30, 32, 34, 36, and/or 38 may be eliminated, and some or all of its functionality may be provided by other ones of modules 30, 32, 34, 36, and/or 38. As another example, processor 20 may be configured to execute one or more additional modules that may perform some or all of the functionality attributed below to one of modules 30, 32, 34, 36, and/or 38.

Figure 3:
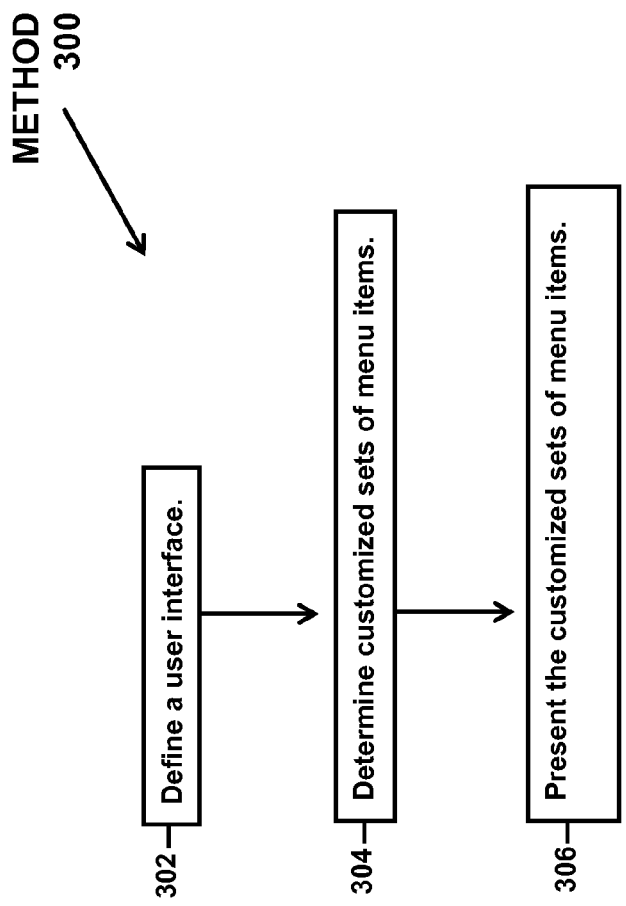
FIG. 3 illustrates a method for customizing a default set of menu items for diners of a food service establishment.

FIG. 3 illustrates a method 300 for customizing a default set of menu items for diners of a food service establishment. The operations of method 300 presented below are intended to be illustrative. In some implementations, method 300 may be accomplished with one or more additional operations not described, and/or without one or more of the operations discussed. Additionally, the order in which the operations of method 300 are respectively illustrated in FIG. 3, and described below is not intended to be limiting.

In some implementations, method 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 300 in response to instructions stored electronically on an electronic storage medium. The one or more processing devices may include one or more devices configured through hardware, firmware, and/or software to be specifically designed for execution of one or more of the operations of method 300.

At an operation 302, a user interface may be defined. The user interface may be defined such that the user interface presents a default set of menu items to diners. The user interface may be defined such that the user interface facilitates entry and/or selection of dietary preference information from the diners. The dietary preference information may include one or more of the dietary preferences of the diners, religious preferences of the diners, specific dietary labels, and/or other information. In some implementations, the specific dietary labels may include vegetarian, vegan, gluten free, kosher, and/or other dietary labels. The default menu items may include default ingredient information associated with the default menu items. Operation 302 may be performed by a menu module that is the same as or similar to menu module 30 (shown in FIG. 1 and described herein).

At an operation 304, customized sets of menu items may be determined. The customized sets of menu items may be determined based on received dietary preference information. For example, responsive to receiving first dietary preference information from a first diner, a first customized set of menu items may be determined. In some implementations, the first customized set of menu items may include a first menu item not in the default set of menu items. Customized ingredient information associated with the customized sets of menu items may be determined based on the dietary preference information. Operation 304 may be performed by a customization module that is the same as or similar to customization module 32 (shown in FIG. 1 and described herein).

At an operation 306, the customized sets of menu items may be presented. The customized sets of menu items may be presented via a user interface. The user interface may be displayed on a client device located in the food service establishment and/or located remotely from the food service establishment. The customized sets of menu items may be presented to the corresponding diners that entered their dietary preference information. Operation 306 may be performed by a menu module and a user interface that are the same as or similar to menu module 30 and user interface 40 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to customize a default set of menu items for diners of a food service establishment, the default set of menu items customized based on dietary preferences of the diners, the system comprising:
   one or more physical processors configured by computer-readable instructions to:
      effectuate presentation of a user interface such that the user interface presents the default set of menu items to the diners and facilitates entry and/or selection of dietary preference information from the diners, the dietary preference information including special preparation instructions;
      determine customized sets of menu items for presentation through the user interface based on received dietary preference information such that, responsive to receiving first dietary preference information from a first diner, determine a first customized set of menu items that is specific to the first diner, the first customized set of menu items being determined such that a first menu item not in the default set of menu items is included in the first customized set of menu items, wherein the first dietary preference information includes first special preparation instructions for preparing the first menu item in a special area within the food service establishment; and
      effectuate presentation of the customized sets of menu items to the corresponding diners via the user interface.

2. The system of claim 1, wherein the one or more physical computer processors are configured such that the default menu items include default ingredient information associated with the default menu items.

3. The system of claim 2, wherein the one or more physical computer processors are configured to determine customized ingredient information associated with the customized sets of menu items based on the dietary preference information.

4. The system of claim 1, wherein the one or more physical computer processors are configured such that the dietary preference information includes one or more of the dietary preferences of the diners, religious preferences of the diners, or specific dietary labels,
   wherein the specific dietary labels include one or more of vegetarian, vegan, gluten free, or kosher.

5. The system of claim 1, wherein the one or more physical computer processors are further configured to manage user profiles of the diners, and determine the customized sets of menu items based on the user profiles of the diners.

6. The system of claim 5, wherein the one or more physical computer processors are configured such that the user profiles include dietary preference information for the diners.

7. The system of claim 6, wherein the one or more physical computer processors are configured such that the dietary preference information in the user profiles is determined based on one or more of past dietary preference information entered and/or selected by the diners or past menu selections made by the diners.

8. The system of claim 1, wherein the one or more physical computer processors are further configured to transmit the definition of the user interface to a client device associated with an individual diner.

9. The system of claim 8, wherein the client device associated with the individual diner is located remotely from the food service establishment.

10. The system of claim 8, wherein the one or more physical computer processors are configured to transmit the definition of the user interface to a client device associated with the food service establishment.

11. A method for customizing a default set of menu items for diners of a food service establishment, the customization based on dietary preferences of the diners, the method comprising:

effectuating presentation of a user interface such that the user interface presents the default set of menu items to the diners and facilitates entry and/or selection of dietary preference information from the diners, the dietary preference information including special preparation instructions;

determining customized sets of menu items for presentation through the user interface based on received dietary preference information such that, responsive to receiving first dietary preference information from a first diner, a first customized set of menu items that is specific to the first diner is determined, the first customized set of menu items being determined such that a first menu item not in the default set of menu items is included in the first customized set of menu items, wherein the first dietary preference information includes first special preparation instructions for preparing the first menu item in a special area within the food service establishment; and effectuating presentation of the customized sets of menu items to the corresponding diners via the user interface.

12. The method of claim 11, wherein the default menu items include default ingredient information associated with the default menu items.

13. The method of claim 12, further comprising determining customized ingredient information associated with the customized sets of menu items based on the dietary preference information.

14. The method of claim 11, wherein the dietary preference information includes one or more of the dietary preferences of the diners, religious preferences of the diners, or specific dietary labels, wherein the specific dietary labels include one or more of vegetarian, vegan, gluten free, or kosher.

15. The method of claim 11, further comprising managing user profiles of the diners, and determining the customized sets of menu items based on the user profiles of the diners.

16. The method of claim 15, wherein the user profiles include dietary preference information for the diners.

17. The method of claim 16, further comprising determining the dietary preference information in the user profiles based on one or more of past dietary preference information entered and/or selected by the diners or past menu selections made by the diners.

18. The method of claim 11, further comprising transmitting the definition of the user interface to a client device associated with an individual diner.

19. The method of claim 18, wherein the client device associated with the individual diner is located remotely from the food service establishment.

20. The method of claim 18, further comprising transmitting the definition of the user interface to a client device associated with the food service establishment.

* * * * *